(12) United States Patent
Ciampa

(10) Patent No.: US 12,709,422 B2
(45) Date of Patent: Aug. 18, 2026

(54) UNMANNED AERIAL VEHICLE SYSTEM HAVING MULTIPLE DRONES

(71) Applicant: John Ciampa, Coral Gables, FL (US)

(72) Inventor: John Ciampa, Coral Gables, FL (US)

( * ) Notice: Subject to any disclaimer, the term of this patent is extended or adjusted under 35 U.S.C. 154(b) by 57 days.

(21) Appl. No.: 19/042,372

(22) Filed: Jan. 31, 2025

(65) Prior Publication Data

US 2026/0184451 A1 Jul. 2, 2026

Related U.S. Application Data

(60) Provisional application No. 63/552,756, filed on Feb. 13, 2024.

(51) Int. Cl.

| | |
|---|---|
| ***B64U 80/40*** | (2023.01) |
| ***B64U 10/30*** | (2023.01) |
| ***B64U 10/60*** | (2023.01) |
| ***B64U 20/65*** | (2023.01) |
| ***B64U 20/80*** | (2023.01) |

(Continued)

(52) U.S. Cl.

CPC ............. *B64U 80/40* (2023.01); *B64U 10/30* (2023.01); *B64U 10/60* (2023.01); *B64U 20/65* (2023.01); *B64U 20/80* (2023.01); *B64U 50/30* (2023.01); *B64U 70/20* (2023.01); *B64U 80/25* (2023.01); *B64U 80/82* (2023.01); *B64U 2101/20* (2023.01); *B64U 2101/25* (2023.01); *B64U 2101/30* (2023.01)

(58) Field of Classification Search

CPC ........ B64U 80/40; B64U 80/25; B64U 80/82; B64U 20/80; B64U 20/65; B64U 10/30; B64U 10/60; B64U 50/30; B64U 70/20; B64U 2101/20; B64U 2101/25; B64U 2101/30

See application file for complete search history.

(56) References Cited

U.S. PATENT DOCUMENTS

| | | | | |
|---|---|---|---|---|
| 9,139,279 | B2 * | 9/2015 | Heppe | B64B 1/54 |
| 9,305,280 | B1 | 4/2016 | Berg et al. | |

(Continued)

FOREIGN PATENT DOCUMENTS

| | | | |
|---|---|---|---|
| AU | 2020100603 | B4 | 5/2020 |
| BE | 1027331 | B1 | 3/2021 |

(Continued)

*Primary Examiner* — Tye William Abell

(74) *Attorney, Agent, or Firm* — MacMillan, Sobanski & Todd, LLC

(57) ABSTRACT

Unmanned aerial vehicle systems are described herein. An unmanned aerial vehicle system includes a carrier unmanned aerial vehicle, a first drone unmanned aerial vehicle, and a second drone unmanned aerial vehicle. The carrier unmanned aerial vehicle has a first, top side, a second, bottom side opposably facing the first, top side, a control system, and a carrier transceiver for conducting communications with a remote location. The first drone unmanned aerial vehicle is attached to the first, top side of the carrier unmanned aerial vehicle. The second drone unmanned aerial vehicle attached to the second, bottom side of the carrier unmanned aerial vehicle. Each of the first drone unmanned aerial vehicle and the second drone unmanned aerial vehicle includes a drone control system and a drone transceiver for conducting communications with a remote location.

18 Claims, 2 Drawing Sheets

(51) Int. Cl.

| | |
|---|---|
| ***B64U 50/30*** | (2023.01) |
| ***B64U 70/20*** | (2023.01) |
| ***B64U 80/25*** | (2023.01) |
| ***B64U 80/82*** | (2023.01) |
| *B64U 101/20* | (2023.01) |
| *B64U 101/25* | (2023.01) |
| *B64U 101/30* | (2023.01) |

(56) References Cited

U.S. PATENT DOCUMENTS

| | | | | |
|---|---|---|---|---|
| 2009/0152391 | A1* | 6/2009 | McWhirk | B64B 1/70 244/30 |
| 2016/0304217 | A1* | 10/2016 | Fisher | B60L 53/00 |
| 2017/0029099 | A1 | 2/2017 | Chen | |
| 2017/0369169 | A1* | 12/2017 | Lee | B64U 10/16 |
| 2019/0176986 | A1* | 6/2019 | Addonisio | B64U 70/90 |
| 2023/0086129 | A1* | 3/2023 | Pagliccia | B64D 1/02 244/17.23 |

FOREIGN PATENT DOCUMENTS

| | | | |
|---|---|---|---|
| CN | 112874776 | A | 6/2021 |
| FR | 3030454 | A1 | 6/2016 |
| WO | 2014080386 | A2 | 5/2014 |

* cited by examiner

UNMANNED AERIAL VEHICLE SYSTEM HAVING MULTIPLE DRONES

FIELD

The disclosure relates to the field of unmanned aerial vehicle systems. More specifically, the disclosure relates to an unmanned aerial vehicle system that has multiple drones.

BACKGROUND

Currently, unmanned aerial vehicle systems fly to and from their intended targets and, in some cases, can include multiple unmanned aerial vehicles. However, current systems have drawbacks. For example, current systems fail to provide the ability to survey both overhead objects and ground objects.

A need exists, therefore, for improved unmanned aerial vehicle systems.

BRIEF SUMMARY OF SELECTED EXAMPLES

Various example unmanned aerial vehicle systems are described.

An example unmanned aerial vehicle system includes a carrier unmanned aerial vehicle, a first drone unmanned aerial vehicle, and a second drone unmanned aerial vehicle. The carrier unmanned aerial vehicle has a first, top side, a second, bottom side opposably facing the first, top side, a control system, and a carrier transceiver for conducting communications with a remote location. The first drone unmanned aerial vehicle is attached to the first, top side of the carrier unmanned aerial vehicle. The second drone unmanned aerial vehicle attached to the second, bottom side of the carrier unmanned aerial vehicle. Each of the first drone unmanned aerial vehicle and the second drone unmanned aerial vehicle includes a drone control system and a drone transceiver for conducting communications with a remote location.

Additional understanding of the unmanned aerial vehicle systems can be obtained by reviewing the detailed description of selected examples, below, and the referenced drawings.

DETAILED DESCRIPTION OF SELECTED EXAMPLES

The following detailed description and the appended drawings describe and illustrate various example unmanned aerial vehicle systems. The description and illustration of these examples enable one skilled in the art to make and use an unmanned aerial vehicle system. They are not intended to limit the scope of the claims in any manner. The invention is capable of being practiced or carried out in various ways and the examples described and illustrated herein are merely selected examples of the various ways of practicing or carrying out the invention and are not considered exhaustive.

Figure 1:
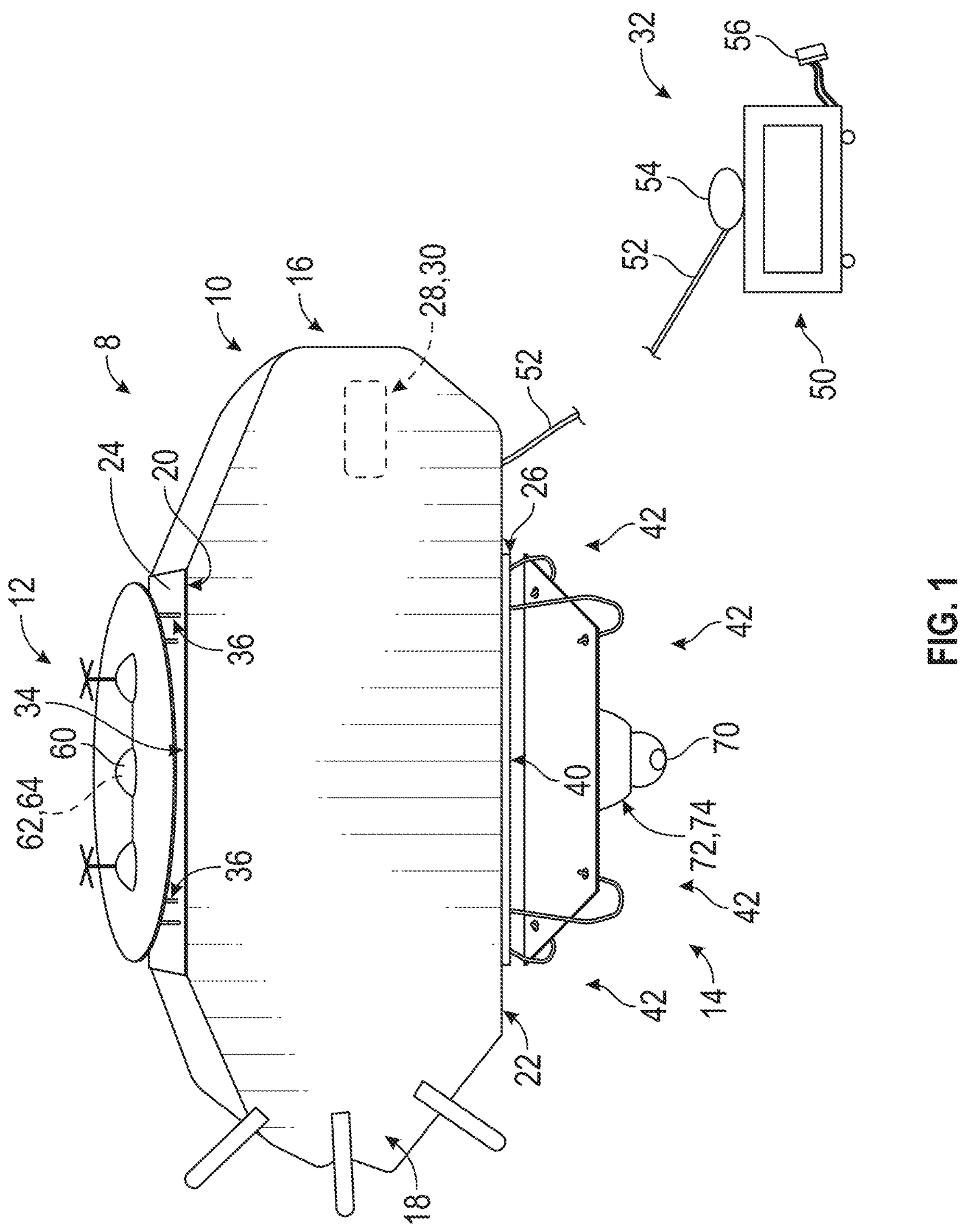
FIG. 1 is a partial perspective view of an example unmanned aerial vehicle system.
Figure 2:
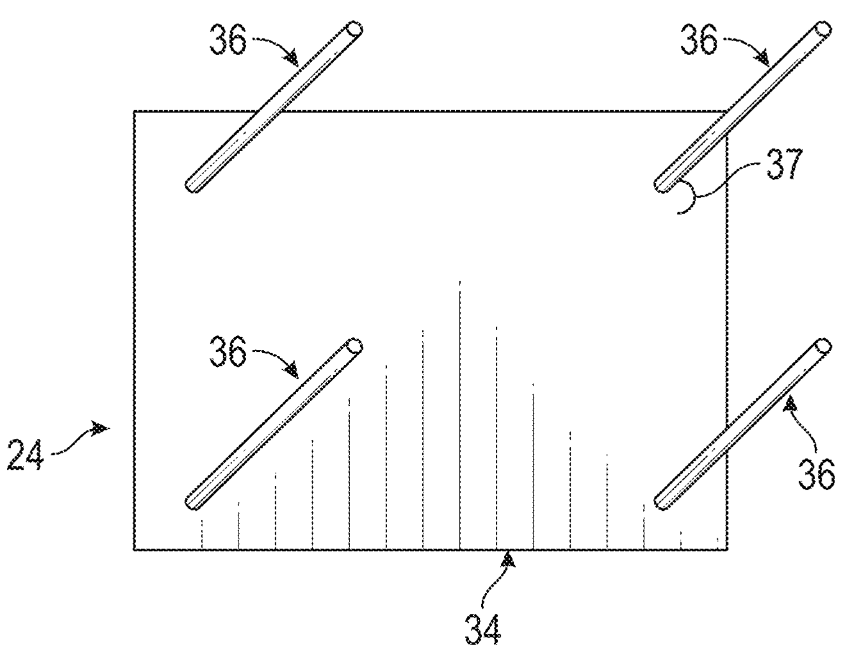
FIG. 2 is a perspective view of a first platform free of an unmanned aerial vehicle.
Figure 3:
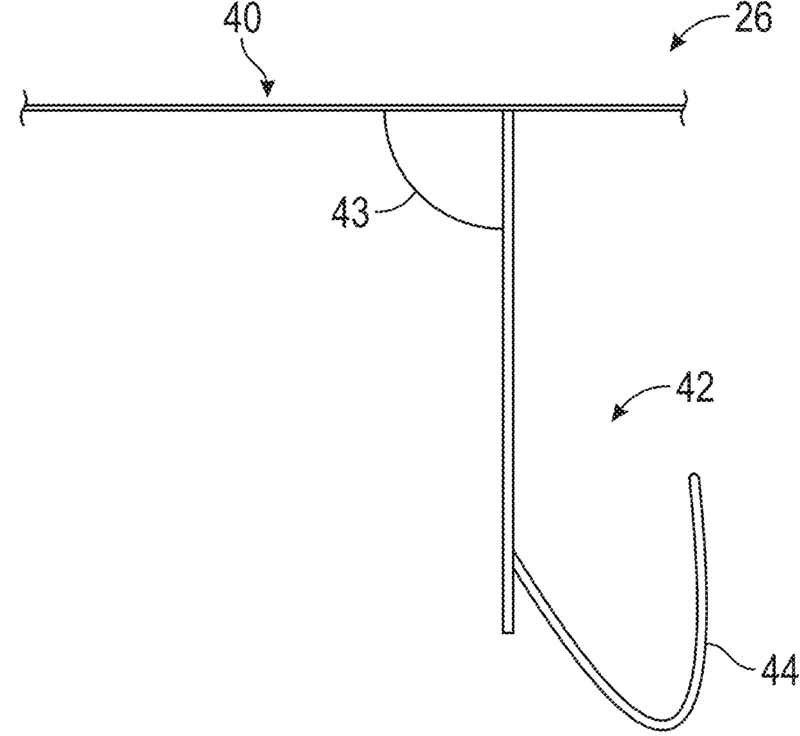
FIG. 3 is a partial elevation view of a second platform free of an unmanned aerial vehicle.

FIGS. 1, 2, and 3 illustrate an example unmanned aerial vehicle system 8. The system 8 includes a carrier unmanned aerial vehicle 10, a first drone unmanned aerial vehicle 12, and a second drone unmanned aerial vehicle 14.

The carrier unmanned aerial vehicle 10 has a nose 16, a plurality of fins 18, a first, top side 20, a second, bottom side 22 opposably facing the first, top side 20, a first platform 24 disposed on the first, top side 20, a second platform 26 disposed on the second, bottom side 22, a control system 28, and a carrier transceiver 30 for conducting communications with a remote location 32. In the illustrated embodiment, the carrier unmanned aerial vehicle is formed of a first material. A carrier unmanned aerial vehicle can be formed as any suitable vehicle and selection of a suitable vehicle can be based on various considerations, such as the intended use of the vehicle. Examples of a carrier unmanned aerial vehicles considered suitable to include in a system include lighter-than-air blimps, airships, planes, drones, and any other aerial vehicle considered suitable for a particular embodiment.

As shown in FIG. 2, the first platform 24 includes a first base 34 and a first plurality of tubular members 36 that extend from the first base 34. The first base 34 is attached to the carrier unmanned aerial vehicle 10. In the embodiment shown, the first platform 24 is formed of a second material. Each tubular member of the first plurality of tubular members 36 is disposed at a first angle 37 relative to the first base 34. In the illustrated embodiments, the first angle 37 is equal to about 90 degrees. However, in alternative embodiments, a first angle can be any suitable angle, such as those greater than, or less than, 90 degrees. In the embodiment shown, each tubular member of the first plurality of tubular members 36 is elongated, forms an I-shaped tubular member, and is formed of carbon fiber. However, in alternative embodiments, a tubular member can have any suitable structural arrangement and be formed of any suitable material. Alternatively, a solid member can be utilized in place of a tubular member.

The second platform 26 includes a second base 40 and a second plurality of tubular members 42 that extend from the second base 40. The second base 40 is attached to the carrier unmanned aerial vehicle 10. In the embodiment shown, the second platform 26 is formed of a third material. Each tubular member of the second plurality of tubular members 42 defines a bend 44 and is disposed at a second angle 43 relative to the second base 40. In the illustrated embodiment, the second angle 43 is equal to about 90 degrees. However, in alternative embodiments, a second angle can be any suitable angle, such as those greater than, or less than, 90 degrees. Each tubular member of the second plurality of tubular members 42 forms a J-shaped tubular member. In the embodiment shown, each tubular member of the second plurality of tubular members 42 is formed of carbon fiber. However, in alternative embodiments, a tubular member can have any suitable structural arrangement and be formed of any suitable material. Alternatively, a solid member can be utilized in place of a tubular member. In the illustrated embodiment, the first material is different than the second material and the third material. However, alternative embodiments can include components in which a first material is the same as a second material or a third material, a first material is the same as a second material and a third material, and any other combination of materials considered suitable for a particular embodiment.

Each of the first plurality of tubular members 36 and the second plurality of tubular members 42 include four tubular members. However, in alternative embodiments, a plurality of tubular members can include any suitable number of members, such as more than one, two, three, four, five, six, seven, eight, nine, ten, more than ten, and any other number considered suitable for a particular embodiment.

In the embodiment shown, the carrier unmanned aerial vehicle 10 is tethered to a ground station 50 using a tether 52. The ground control station 50 has a reel 54 and is connected to a source of energy 56 (e.g., battery, outlet). A real included in a system can comprise any suitable reel, such as a smart reel that controls altitude and the stability of the carrier unmanned aerial vehicle. The tether 52 provides both signal and power to the carrier unmanned aerial vehicle 10, the first drone unmanned aerial vehicle 12 when attached to the carrier unmanned aerial vehicle 10, and the second drone unmanned aerial vehicle 14 when attached to the carrier unmanned aerial vehicle 10.

The first drone unmanned aerial vehicle 12 is attached to the first, top side 20 of the carrier unmanned aerial vehicle 10 between the nose 16 and the plurality of fins 18. In the illustrated embodiment, the first drone unmanned aerial vehicle 12 is attached to the first platform 24. The first drone unmanned aerial vehicle 12 includes a camera 60, a drone control system 62, and a drone transceiver 64 for conducting communications with a remote location 32. The first drone unmanned aerial vehicle 12 is partially disposed within each tubular member of the first plurality of tubular members 36 and the first platform 24 (e.g., one or more tubular members of the first plurality of tubular members 36) provides power to the first drone unmanned aerial vehicle 12. The fit between a portion of the first drone unmanned aerial vehicle 12 (e.g., legs) within the first plurality of tubular members 36 is such that the first drone unmanned aerial vehicle 12 can take off from the system 8 by vertical takeoff. In the embodiment shown, this is the only method for takeoff for the first drone unmanned aerial vehicle 12. The first platform's 24 unobstructed overhead allows for unobstructed overhead surveillance by the first drone unmanned aerial vehicle 12 and at the same time makes the first drone unmanned aerial vehicle 12 a primary launch drone. Once launched at altitude, the first drone unmanned aerial vehicle 12 has a downhill path to any suitable target.

The second drone unmanned aerial vehicle 14 is attached to the second, bottom side 22 of the carrier unmanned aerial vehicle 10 between the nose 16 and the plurality of fins 18. In the illustrated embodiment, the second drone unmanned aerial vehicle 14 is attached to the second platform 26. The second drone unmanned aerial vehicle 14 includes a camera 70, a drone control system 72, and a drone transceiver 74 for conducting communications with a remote location 32. The second drone unmanned aerial vehicle 14 is partially disposed within each tubular member of the second plurality of tubular members 42 and the second platform 26 (e.g., one or more tubular members of the second plurality of tubular members 42) provides power to the second drone unmanned aerial vehicle 14. The second drone unmanned aerial vehicle 14 is different than the first drone unmanned aerial vehicle 12. The fit between a portion of the second drone unmanned aerial vehicle 14 (e.g., legs) within the second plurality of tubular members 42 (e.g., short portion of J-tubular member) is such that the second drone unmanned aerial vehicle 14 can take off from the system 8 by vertical takeoff. The long portion of each tubular member of the second plurality of tubular members 42 has a length greater than the thickness of the second drone unmanned aerial vehicle 14 to provide sufficient overhead space for vertical takeoff of the second drone unmanned aerial vehicle 14. The launch of the second drone unmanned aerial vehicle 14 can be reserved for special circumstances where both drones 12, 14 are required. A portion of the carrier unmanned aerial vehicle 10 disposed above the second drone unmanned aerial vehicle 14 can be formed of a material (e.g., different than the material forming the remainder of the carrier unmanned aerial vehicle 10) that protects the carrier unmanned aerial vehicle 10 from contact with a portion of the second drone unmanned aerial vehicle 14 (e.g., propellers). The structural arrangement of the second platform 26 and the second plurality of tubular members 42 allows the second drone unmanned aerial vehicle 14 to become a downward imaging component of the system 8 while in place.

While the first drone unmanned aerial vehicle 12 and the second drone unmanned aerial vehicle 14 have been illustrated as attached to the carrier unmanned aerial vehicle 10 between the nose 16 and the plurality of fins 18, a drone unmanned aerial vehicle can be attached to, or disposed at, any suitable location on a carrier unmanned aerial vehicle, such as at the fins, on a fin, at the nose, on the nose, or any other location considered suitable for a particular embodiment.

In use, the unmanned aerial vehicle system 8 provides a mechanism for providing an extending surveillance of both above and below the carrier unmanned aerial vehicle 10. For example, while attached to the carrier unmanned aerial vehicle 10, each of the first drone unmanned aerial vehicle 12 and the second drone unmanned aerial vehicle 14 are stationary relative to the carrier unmanned aerial vehicle 10 and can function as monitors using their respective cameras 60, 70. In this state, each of the first and second drone unmanned aerial vehicles 12, 14 can provide imagery and sensed data to the ground station 50 and/or a remote location 32 and/or act as a signal relay.

The first drone unmanned aerial vehicle 12 has an unobstructed view of any objects over the system 8 during use, such as incoming drones or airborne particles. When at altitude, the system 8 provides an expand perspective and optimizes the operation of the first and second drone unmanned aerial vehicles 12, 14 since they can be launched at altitude and controlled by standard drone controllers on the ground.

Those with ordinary skill in the art will appreciate that various modifications and alternatives for the described and illustrated examples can be developed in light of the overall teachings of the disclosure, and that the various elements and features of one example described and illustrated herein can be combined with various elements and features of another example without departing from the scope of the invention. Accordingly, the particular arrangement of elements disclosed herein have been selected by the inventor(s) simply to describe and illustrate examples of the invention and are not intended to limit the scope of the invention or its protection, which is to be given the full breadth of the appended claims and any and all equivalents thereof.

What is claimed is:

1. An unmanned aerial vehicle system comprising:

a carrier unmanned aerial vehicle comprising a first, top side, a second, bottom side opposably facing the first, top side, a first platform disposed on the first, top side, a second platform disposed on the second, bottom side, a control system, and a carrier transceiver for conducting communications with a remote location;

the second platform including a second base and a plurality of members extending from the second base, each member of the plurality of members defining a bend;

a first drone unmanned aerial vehicle attached to the first platform first, top side of the carrier unmanned aerial vehicle;

a second drone unmanned aerial vehicle attached to the plurality of members second, bottom side of the carrier unmanned aerial vehicle; and each of the first drone unmanned aerial vehicle and the second drone unmanned aerial vehicle comprising: a drone control system and a drone transceiver for conducting communications with the remote location.

2. The system of claim 1, wherein the carrier unmanned aerial vehicle is an airship.

3. The system of claim 1, wherein the carrier unmanned aerial vehicle is formed of a first material;

wherein the first platform is formed of a second material;

wherein the second platform is formed of a third material; and wherein the first material is different than the second material and the third material.

4. The system of claim 1, wherein the first drone unmanned aerial vehicle includes a first camera; and wherein the second drone unmanned aerial vehicle includes a second camera.

5. The system of claim 1, wherein the carrier unmanned aerial vehicle is tethered to a ground station, the ground station including a reel and connected to a source of energy.

6. The system of claim 1, wherein the carrier unmanned aerial vehicle has a nose and a plurality of fins; and wherein each of the first drone unmanned aerial vehicle and the second drone unmanned aerial vehicle is disposed between the nose and the plurality of fins.

7. The system of claim 1, wherein the second drone unmanned aerial vehicle is different than the first drone unmanned aerial vehicle.

8. The system of claim 1, wherein the second platform includes a second base and a second plurality of tubular members comprises a second plurality of tubular members extending from the second base, each tubular member of the second plurality of tubular members defining the bend and disposed at a second angle relative to the second base.

9. The system of claim 8, wherein the second angle is equal to 90 degrees; and wherein each tubular member of the second plurality of tubular members forms a J-shaped tubular member formed of carbon fiber.

10. The system of claim 8, wherein the second drone unmanned aerial vehicle is partially disposed within each tubular member of the second plurality of tubular members.

11. The system of claim 10, wherein the second platform provides power to the second drone unmanned aerial vehicle.

12. The system of claim 1, wherein the first platform includes a first base and a first plurality of tubular members extending from the first base, each tubular member of the first plurality of tubular members disposed at a first angle relative to the first base.

13. The system of claim 12, wherein the first angle is equal to 90 degrees.

14. The system of claim 12, wherein each tubular member of the first plurality of tubular members is elongated and formed of carbon fiber.

15. The system of claim 12, wherein the first drone unmanned aerial vehicle is partially disposed within each tubular member of the first plurality of tubular members.

16. The system of claim 15, wherein the first platform provides power to the first drone unmanned aerial vehicle.

17. An unmanned aerial vehicle system comprising:

a carrier unmanned aerial vehicle comprising a first, top side, a second, bottom side opposably facing the first, top side, a first platform disposed on the first, top side, a second platform disposed on the second, bottom side, a control system, and a carrier transceiver for conducting communications with a remote location;

the second platform including a second base and a plurality of members extending from the second base, each member of the plurality of members defining a bend;

a first drone unmanned aerial vehicle attached to the first platform and including a first camera;

a second drone unmanned aerial vehicle attached to the second platform plurality of members and including a second camera, the second drone unmanned aerial vehicle different than the first drone unmanned aerial vehicle; and each of the first drone unmanned aerial vehicle and the second drone unmanned aerial vehicle comprising: a drone control system and a drone transceiver for conducting communications with the remote location;

wherein the carrier unmanned aerial vehicle is an airship.

18. An unmanned aerial vehicle system comprising:

a carrier unmanned aerial vehicle comprising a first, top side, a second, bottom side opposably facing the first, top side, a first platform disposed on the first, top side, a second platform disposed on the second, bottom side, a control system, and a carrier transceiver for conducting communications with a remote location, the carrier unmanned aerial vehicle tethered to a ground station, the ground station including a reel and connected to a source of energy;

the first platform including a first base and a first plurality of tubular members extending from the first base;

the second platform including a second base and a second plurality of tubular members extending from the second base, each tubular member of the second plurality of tubular members defining a bend;

a first drone unmanned aerial vehicle partially disposed within each tubular member of the first plurality of tubular members and including a first camera;

a second drone unmanned aerial vehicle partially disposed within each tubular member of the second plurality of tubular members and including a second camera, the second drone unmanned aerial vehicle different than the first drone unmanned aerial vehicle; and each of the first drone unmanned aerial vehicle and the second drone unmanned aerial vehicle comprising: a drone control system and a drone transceiver for conducting communications with the remote location;

wherein the carrier unmanned aerial vehicle is an airship.

* * * * *